A. R. LANDES.
BALE HOOK.
APPLICATION FILED APR. 26, 1910. RENEWED JULY 28, 1911.
1,001,962. Patented Aug. 29, 1911.
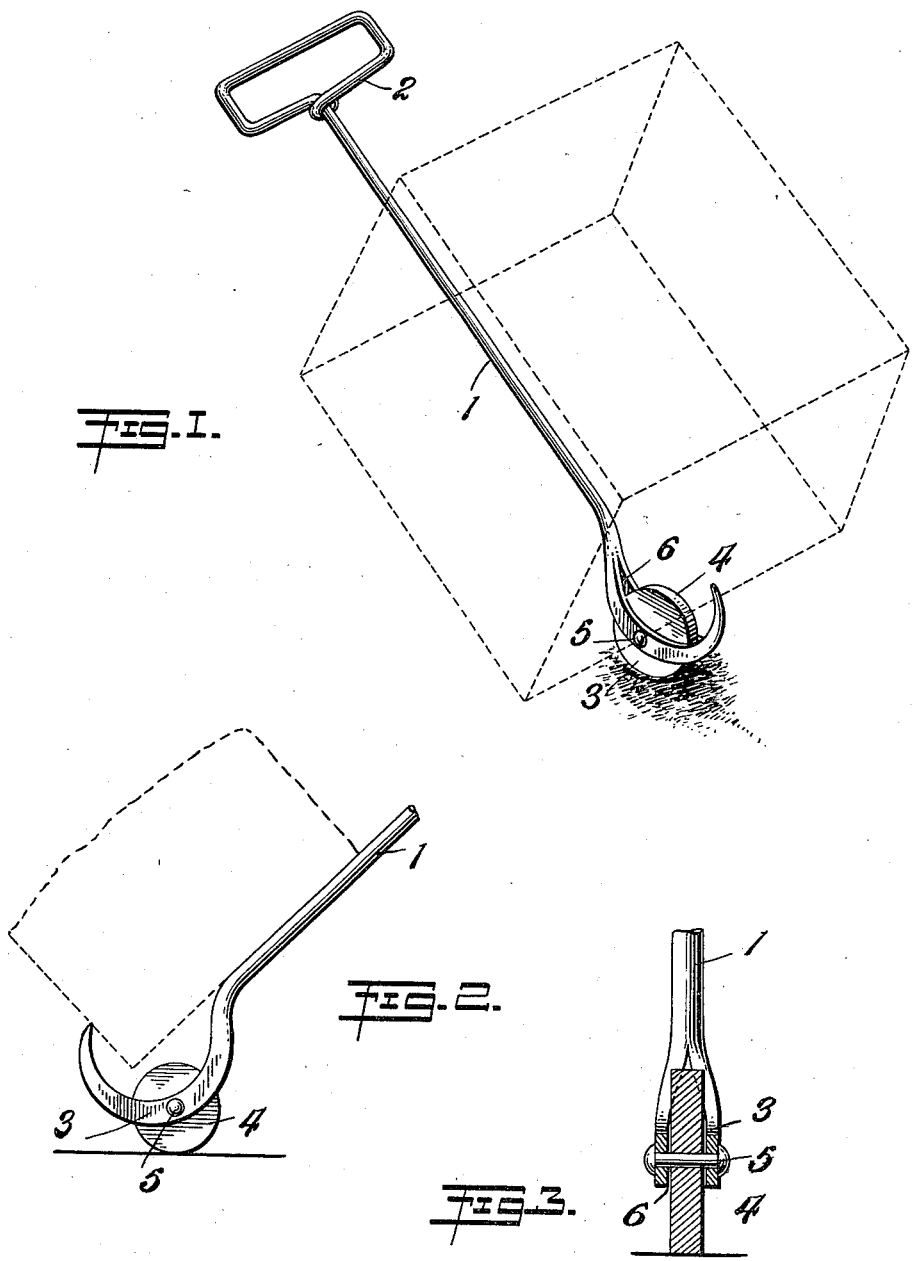
WITNESSES
G. Robert Thomas
G. E. Hoyser.
INVENTOR
Abe R. Landes
BY
Clarence S. Galeton
ATTORNEY

UNITED STATES PATENT OFFICE.

ABE R. LANDES, OF NEW YORK, N. Y., ASSIGNOR OF ONE-HALF TO JOE CAPOBIANCO, OF BROOKLYN, NEW YORK.

BALE-HOOK.

1,001,962.  Specification of Letters Patent.  Patented Aug. 29, 1911.

Application filed April 26, 1910, Serial No. 557,747. Renewed July 28, 1911. Serial No. 641,175.

*To all whom it may concern:*

Be it known that I, ABE R. LANDES, of the city, county, and State of New York, have invented a new and useful Improvement in Bale-Hooks, of which the following is a specification.

This invention relates to improvements in bale-hooks, and more particularly to the hand variety of bale-hook, which is used for handling bales, large or heavy boxes, and other unwieldy and heavy articles.

The object of the invention is to reduce friction when an article is dragged along over the ground by one or more of such bale-hooks.

A further object is to enable a bale or the like to be supported and transported clear of the ground by one or more wheeled bale-hooks.

To these ends, the invention consists in a bale-hook having a ground wheel, roller, or other antifriction means.

The accompanying drawing illustrates the preferred embodiment of the invention, but numerous other embodiments may be produced.

In the said drawing: Figure 1 is a perspective view of the bale-hook, indicating by dotted lines how a bale or other article may be dragged along clear of the ground; Fig. 2 is a side view of the lower part of the bale-hook, indicating a bale or other article by dotted lines; and Fig. 3 is a vertical, transverse section through the lower part of the hook.

In the best embodiment of the invention, the bale-hook is formed with a long shank 1. At one end of this shank is any suitable handle 2. At the other end is the hooked portion, or hook proper, 3.

The antifriction means provided in accordance with the invention may be variously constructed and arranged. In the best form of the invention said means is located at the bottom of the bend or curve of the hooked portion 3. The antifriction means is illustrated as a wheel or roller 4, mounted on a pin 5, in a slot 6 in said hooked portion.

As indicated in Fig. 2, the bale or other article may be tilted up to lie against the long shank, being held against sliding therefrom by the point of the hook struck into the bale. In this position, the bale may be dragged along clear of the ground, being supported entirely by the wheeled bale-hook. Or the bale may be supported on two bale-hooks, for greater stability.

As is evident from Fig. 2, the roller 4 is effectually guarded from contact by a supported bale or the like, said roller being located below the upper line of the shank 1.

The long shank 1 of the bale-hook is of importance, both because it enables a person to drag an article without uncomfortable stooping and because it constitutes a rest for the article.

Having thus described my invention, what I claim as new, and desire to secure by Letters Patent, is:

A bale-hook comprising a shank portion bent adjacent its lower end into a plane below that of said shank portion and bent upwardly at said end into a plane above said bearing portion, said lower end terminating in a hook, the portion below the plane of the shank portion being split, and a roller journaled in said split portion and having its periphery extending beyond the body of said hook, for the purpose set forth.

ABE R. LANDES.

Witnesses:
 CLARENCE G. GALSTON,
 FREDERIC M. SPILLING.

Copies of this patent may be obtained for five cents each, by addressing the "Commissioner of Patents, Washington, D. C."